No. 672,414. Patented Apr. 16, 1901.
W. S. & C. I. CORBY.
MACHINE FOR WORKING AND SHAPING DOUGH.
(Application filed Mar. 6, 1901.)
(No Model.)
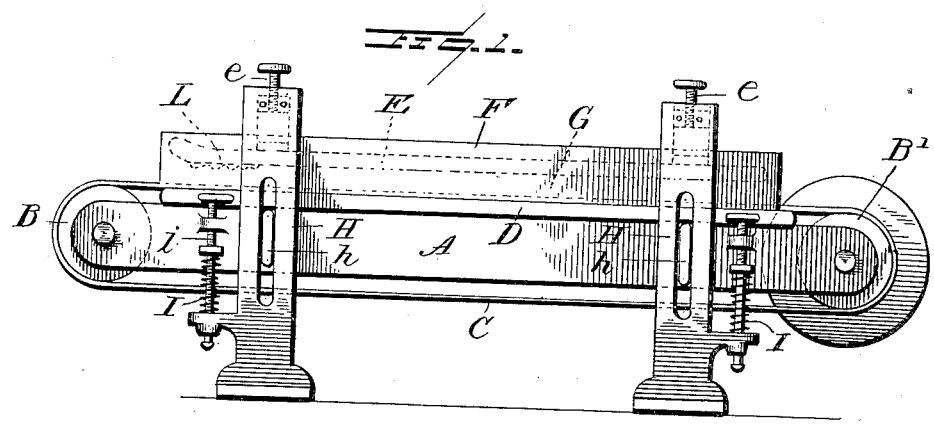
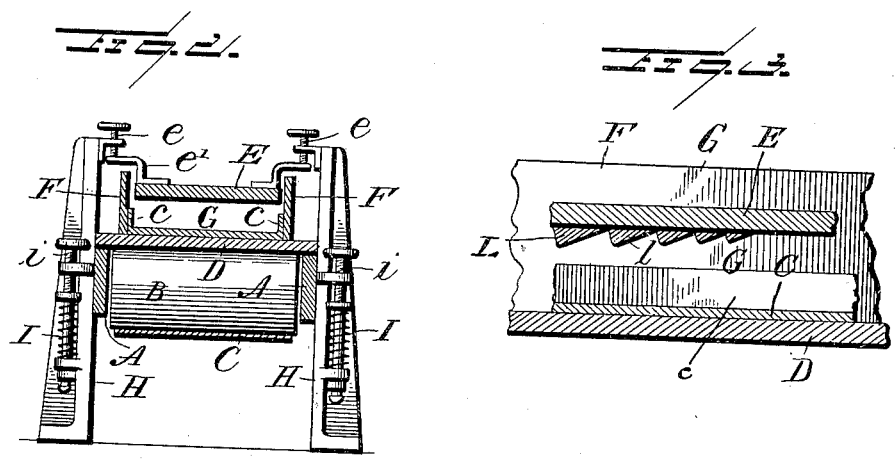
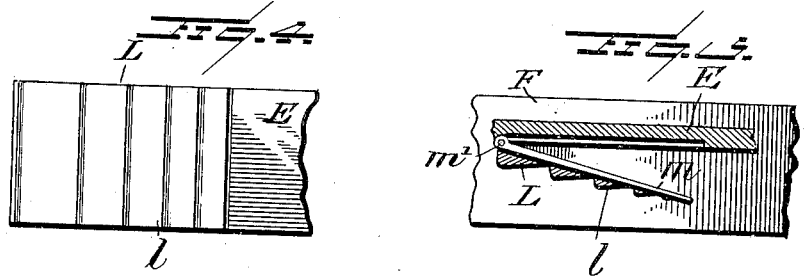
WITNESSES:
Wm F Doyle
Geo. T. May Jr.
INVENTORS,
William S. Corby and
Charles I. Corby
BY J. S. Barker
Attorney
THE NORRIS PETERS CO., PHOTO-LITHO., WASHINGTON, D. C.

UNITED STATES PATENT OFFICE.

WILLIAM S. CORBY AND CHARLES I. CORBY, OF WASHINGTON, DISTRICT OF COLUMBIA.

MACHINE FOR WORKING AND SHAPING DOUGH.

SPECIFICATION forming part of Letters Patent No. 672,414, dated April 16, 1901.

Original application filed February 19, 1898, Serial No. 670,937. Divided and this application filed March 6, 1901. Serial No. 50,103. (No model.)

*To all whom it may concern:*

Be it known that we, WILLIAM S. CORBY and CHARLES I. CORBY, citizens of the United States, residing at Washington, in the District of Columbia, have invented new and useful Improvements in Machines for Working and Shaping Dough, of which the following is a specification.

This application is a division of our application, Serial No. 670,937, filed February 19, 1898.

Figure 1 of the accompanying drawings is a side elevation of a dough working and molding machine embodying our improvements. Fig. 2 is a transverse sectional view of the same. Fig. 3 is an enlarged longitudinal sectional view of part of the apparatus, illustrating particularly the curler. Fig. 4 is a detail inverted plan view of the curler. Fig. 5 is a longitudinal sectional view illustrating a different form of the curler from that shown in the other views.

In the drawings, A represents a frame in which are mounted two rollers B B'. An endless belt C is supported on such rollers and travels between them, suitable driving mechanism (not illustrated) being connected with one of the rollers to turn it and through it to operate the machine. D represents a support, which may be the top of the frame A, over which the belt passes in its movements between the rollers and which holds the belt firmly in working position. This support is non-flexible—that is to say, while as a whole it may be yielding, as will presently be described, it is practically non-flexible from end to end and from side to side—so that the belt C, which is flexible, will be caused to conform to the shape of the surface of the support during the dough-molding operation, and such shape is not changed during the operation of molding a dough mass into a loaf.

E represents a plate or board arranged opposite to the belt C and constituting the pressure or resistance member of the dough engaging and working parts of the machine. In the form of apparatus illustrated it is arranged above the belt and is rigid or non-yielding relative thereto, and it is provided with adjusting devices, such as the screws *e*, by which its position relative to the belt may be varied.

The frame A is mounted between standards H and is so supported that it may move vertically between them, there being interengaging guides *h*, which properly direct the frame in its movement. The frame is supported upon springs I I, which sustain it with a yielding force. We prefer to combine with the springs some sort of regulating devices, such as the adjusting-screws *i*, in order that their effective tension may be varied as may be required.

It will be seen, particularly by reference to Fig. 2, that the space G between the belt C, which constitutes the member of the apparatus that operates to advance the dough mass through the machine, and the opposing pressure and resistance member, which tends to retard the free advance of the dough, constitutes the chamber or passage-way in which the dough is worked and molded. The dough masses being in any suitable manner fed into the forward end of the passage-way G are caused by the movement of the belt to pass through the machine, and they are by the conjoint action of the belt and the pressure board E thoroughly worked, compressed, and shaped into a cylindrical loaf. In order to control the length of the loaf formed and to shape its ends, we provide the chamber or passage-way G with side walls F F, which are preferably perpendicular to the plane of the belt. In the present form of our invention we prefer that these side walls F should be secured to or carried directly by the frame A, being, as represented in Fig. 2, secured to the support D, over which the belt travels, and disposed so as to lie immediately adjacent to the edges of the belt. It will thus be seen that these side walls F partake of the vertical movements of the belt and the frame which supports it. In our Patent No. 590,133, in which is shown a dough-molding machine upon which the machine described in this case is an improvement, the side walls of the dough-molding passage-way were carried by the pressure-board, and this was yielding, while the support over which the traveling belt moved was rigid. The result was that when the opposite faces of the dough-passage, formed by the pressure-board and the opposing-belt and its support, moved toward and from each other, as is the case whenever a dough mass passes through the molding-chamber or passage-way, the side walls moved transversely relative to the belt and rubbed against the edges thereof, thus not only unnecessarily wearing the belt, but also tending to fold over or wrinkle the edges of the belt and cause it to catch between the side walls of the passage and the support for the belt. In a construction such as we have invented and show in this case this is impossible, for the reason already stated, that the side walls are carried by the support for the belt, so that there can be no transverse movement of the side walls relative to the belt.

The side walls F are arranged at a sufficient distance apart and are of a height sufficient to permit the pressure-board E to be situated between them, as clearly shown in Fig. 2, so that whatever be the play or movement of the frame A still the passage-way G is never without closing side walls.

In practice it has been found desirable to have the side edges of the belt perpendicular to the main central part thereof, as represented at c, Fig. 2, while the belt is within the passage-way G. The upturned edges of the belt lie against the inner edges of the side walls F, which operate to maintain them in proper position.

We are aware that it has been proposed to make bread-molding machines having a longitudinal passage-way in which the dough masses are worked and shaped with an advancing member, such as an endless belt or a wheel having side flanges or edges which are disposed at substantially right angles to the main central working face of such advancing member and which extend from such working face practically to the plane of the face of the pressure-board or member which is opposed to the said advancing member of the machine. We have found by operating and experimenting with apparatus thus constructed that it operates to carry forward or advance the ends of the dough loaf more rapidly than the middle part thereof, with the result that the loaf as it emerges at the delivery end of the passage-way is ill-shaped and not properly molded. To overcome these objections, we have in the machine illustrated herein arranged means which operate upon the ends of the dough loaves while in the molding passage-way and which tend to retard the free advance of the end portions of the loaves. These means are the longitudinally-stationary side walls of the passage-way, which, as may be seen from an examination of Fig. 2, are exposed to and consequently engaged by the dough masses as they are carried through the molding passage-way. They operate upon the ends of the loaf both to shape them and to retard their free advance. It will also be observed by reference to the same figure that the turned-up edges or sides c of the belt or advancing member of the apparatus operate upon the ends of the dough loaf to positively advance its end portions. It will thus be seen that the end portions of the dough loaf, as well as the middle portion, are operated upon by means which exert thereupon opposing forces, the side flanges of the belt operating to advance the dough loaf at its ends and the side walls which are exposed to the dough mass and engage therewith operating to retard the forward movement of the dough loaf. By properly proportioning the height of the turned-up edges or sides of the belt to the depth of the passage-way we are enabled to so apply the forces which act upon the dough mass to cause it to advance through the molding passage-way and to roll as it advances as that when the mass emerges at the delivery end it has been uniformly worked from end to end and is as large in the diameter as its ends, but no larger, being practically a cylindrical mass of uniform diameter from end to end. To secure this uniform equalized action upon all parts of the dough loaf being formed the edges c of the belt or advancing member extend about half the distance between the working face of the advancing member and the opposing face of the pressure-board or resisting member when these parts are separated by reason of the passage of a dough mass through the machine.

As the dough mass passes through the machine it is thoroughly worked or kneaded, being caused to roll over and over, so that when it emerges at the delivery end of the machine it is of a round shape in cross-section and has a smooth surface or skin, which has not been broken by the action of the apparatus upon the dough. The working or kneading and shaping of the dough mass by apparatus which compresses it and at the same time causes it to roll over and over and confines it at its ends to prevent undue expansion longitudinally is a most important object of our invention. To insure the best results, the dough should be fed into the passage-way G in the form of a comparatively thin elongated sheet, and this sheet should be coiled or rolled up until it assumes a substantially cylindrical shape. We have not in this application shown mechanism for sheeting the dough, as this step in the process of treatment may be performed by a separate apparatus from that for working and shaping the dough into loaves; but it could easily be arranged at the feed end of the passage-way, and such an arrangement is shown in our aforesaid patent.

In order to certainly insure the coiling and rolling of the dough mass as it is being operated upon, it is found best to thicken the forward end of the dough sheet by folding it upon itself, an operation which we have come to term "curling," so that as it is passed into the passage-way between the advancing and the pressure or resistance members thereof the folded or curled end of the dough mass is on one side subjected to a force which tends to advance it and on the opposite side to a pressure which tends to retard or resist the advance of the mass with the result that the mass is coiled around the thickened, turned, folded, or curled end of the dough sheet as a center, and advancing it increases in diameter until the entire mass is rolled into a substantially cylindrical shape of a length defined by the distance between the side walls F.

In order to automatically perform the curling operation and to properly begin the working or kneading of the dough mass after it enters the chamber or passage-way G, we form the pressure or resistance board or member of the apparatus with a portion of its working surface of narrow dough-engaging surfaces projecting into the dough-passage and arranged to successively operate upon the dough mass. This portion of the pressure-board is represented at L $l$. It preferably consists of a series of cross strips or ribs. While a single strip, rib, or projection L will operate to curl the dough sheet, we prefer to employ several of them and that they should be successively shorter from base to apex, the longest being toward the feed end of the machine. These ribs or projections may be formed with or secured directly to the pressure-board, or they may be attached to a plate $m$, which may be secured in any suitable way to the pressure-board. A preferred form is to secure the cross ribs or projections L $l$ to a plate $m$ and pivotally secure this latter, as at $m'$, to the pressure-board. This construction permits the plate $m$ to drop down or toward the belt C when free or not engaged by a dough mass and to rise when the dough mass engages therewith on its entrance into the passage-way.

In the form of curler which we have shown and just described the first and longest projection or strip L operates to curl—that is to say, fold over or thicken—the advancing edge of the dough mass. The succeeding strips, ribs, or projections operate to carry forward the curling operation to a somewhat greater extent than would the single rib L, and they also operate to work or knead the dough. The number of cross strips or ribs may be more or less in number than represented in the drawings, as may be found to produce the best results. When constructed as described, the pressure-board is formed with a series of separated dough-engaging strips, ribs, or projections, which successively operate upon the dough, and these projections are followed by a smooth surface—that is, a surface without the projections, which operates to finish the working and molding of the dough loaf, delivering it with a smooth unbroken skin.

Having described our invention, what we claim, and desire to secure by Letters Patent, is—

1. In a machine adapted to work and shape dough, the combination of a traveling belt, a pressure-board arranged opposite thereto, whereby there is formed an elongated passage-way between the belt and pressure-board in which the dough is worked, a non-flexible support over which the belt moves, and side walls carried by the said non-flexible support and constituting the sides of the said passage-way, substantially as set forth.

2. In a machine adapted to work and shape dough, the combination of an advancing member and an opposing pressure member, these two being arranged to act simultaneously upon the opposite sides of a dough mass, the advancing member being yielding relative to the pressure member, substantially as set forth.

3. In a machine adapted to work and shape dough, the combination of a yielding frame, a belt mounted therein and adapted to engage with the dough masses, means for moving the belt, and an opposing pressure device against which the dough masses are held by the said yielding frame and belt, substantially as set forth.

4. In a machine adapted to work dough, the combination of a yielding advancing member, an opposing pressure member, these two members constituting respectively the wider walls of an elongated passage-way through which the dough masses are passed, and side walls or flanges constituting the sides of such passage-way, substantially as set forth.

5. The combination of a traveling belt, a support across which the belt travels, an opposing pressure or resistance member, and side walls carried by or connected with the support across which the belt moves, the edges of the belt being substantially perpendicular to the main central part thereof, and situated on the inside of the said side walls, substantially as set forth.

6. The combination of a traveling belt, a support or table across which it travels, side walls substantially perpendicular to the said support and connected with or carried thereby, and an opposing pressure or resistance member arranged between the said side walls, substantially as set forth.

7. In an apparatus for making bread loaves of dough having a passage-way through which the dough masses are moved, the combination of means for advancing the dough through such passage-way, means in opposition thereto for resisting the free advance of the dough masses, the said means operating on opposite sides of the dough loaves, and means operating on the ends of the dough loaves for resisting their free advance, such means being at the longitudinal sides of the said passage-way, substantially as set forth.

8. In an apparatus for making bread loaves of dough having a passage-way through which the dough masses are advanced and rolled, the combination of means on one side of the dough mass for advancing it through the passage-way, means on the opposite side for resisting such advance, means engaging with the ends of the dough mass while in the passage-way for positively advancing it, and also means engaging with the ends of the dough mass for retarding its forward movement, whereby the advancing and the rolling movements of the dough mass are equalized from the center to the ends thereof, substantially as set forth.

9. In an apparatus for making bread loaves of dough having a passage-way through which the dough masses are advanced and rolled, the combination of means on one side of the dough masses for advancing them, means on the opposite side of the dough masses for retarding their advance while in the passage-way, one of said means being yielding relative to the other, and means which engage with the ends of the masses while in the passage-way and shape them and operating also to close the sides of the passage-way, substantially as set forth.

10. A pressure member or kneader for a dough-working machine, having a portion of its operating-surface formed of successively operating, narrow, dough-engaging surfaces, substantially as set forth.

11. In a machine adapted to work dough, the combination of an advancing member, an opposing pressure member for the dough, and a curler comprising a plurality of cross strips or projections, adapted to engage with and temporarily retard the forward edge of the dough mass whereby it is thickened at such point, substantially as set forth.

12. A machine such as described, comprising a pressure member, and advancing member covered by the pressure member, the latter having a part which has a pivotal motion toward and from the advancing member, as set forth.

13. A machine such as described, comprising a pressure member and a carrying-apron under the pressure member, the latter having a pivotal part provided with projections extending toward the apron, as set forth.

14. In a machine adapted to work dough the combination of an advancing member, an opposing pressure member, and a curler, consisting of a plurality of cross strips or projections of different lengths, substantially as set forth.

15. In a machine adapted to work dough, the combination of an advancing member, an opposing pressure member, and a curler consisting of a plurality of cross strips or projections of different lengths, the longest being toward the feed end of the machine as set forth.

16. In a machine adapted to work dough, the combination of a pressure member having a portion of its operating-surface formed of a series of narrow projections arranged to successively engage with and operate upon the dough, and a portion in rear thereof without such projections, and means for advancing the dough arranged opposite to the said pressure member, substantially as set forth.

17. In a machine for working and shaping dough, the combination of a traveling belt, a support across which it travels, side walls substantially perpendicular to the said support, an opposing pressure-board or resistance member arranged between the said side walls, and means for adjusting the said pressure member relative to the said side walls and the traveling belt, substantially as set forth.

WILLIAM S. CORBY.
CHARLES I. CORBY.

Witnesses:
J. S. BARKER,
GEO. R. LIRKINS.